(12) United States Patent
Schlenker

(10) Patent No.: US 6,202,498 B1
(45) Date of Patent: Mar. 20, 2001

(54) SCREW WITH RECIRCULATING BALL ARRANGEMENT

(75) Inventor: Theodore R. Schlenker, Troy, MI (US)

(73) Assignee: Beaver Aerospace & Defense, Inc., Livonia, MI (US)

( * ) Notice: Subject to any disclaimer, the term of this patent is extended or adjusted under 35 U.S.C. 154(b) by 0 days.

(21) Appl. No.: 09/195,288

(22) Filed: Nov. 13, 1998

Related U.S. Application Data

(60) Provisional application No. 60/065,573, filed on Nov. 14, 1997.

(51) Int. Cl.$^7$ .................................................. F16H 27/02
(52) U.S. Cl. ........................................ 74/89.15; 74/424.8 R
(58) Field of Search ........................... 74/89.15, 424.8 R, 74/459, 424.8 B

(56) References Cited

U.S. PATENT DOCUMENTS

| | | | |
|---|---|---|---|
| 4,542,661 | * | 9/1985 | Teramachi ..................... 74/424.8 NA |
| 4,939,946 | * | 7/1990 | Teramachi ........................... 74/89.15 |
| 5,279,175 | * | 1/1994 | Kasuga et al. ........................... 74/459 |
| 5,704,250 | * | 1/1998 | Black ............................... 74/424.8 B |
| 5,899,114 | * | 5/1999 | Dolata et al. ..................... 74/424.8 B |

* cited by examiner

Primary Examiner—David Fenstermacher
(74) Attorney, Agent, or Firm—Rohm & Monsanto, P.L.C.

(57) ABSTRACT

An axial displacement arrangement in the form of a ball screw and nut achieves a highly compact configuration by effecting ball recirculation entirely within the ball screw shaft. The ball recirculation portion of the ball screw shaft is axially short with respect to an elongated driven nut. As the nut is rotated, illustratively by an electric motor coupled thereto, the ball screw shaft is displaced axially along an axial support member. The axial support member has radially outward extending splines, and the ball recirculation portion of the ball screw shaft has radially inward extending splines, the inward and outward splines being arranged to face one another whereby a linear ball bearing region is formed. The linear ball bearing permits the ball recirculation arrangement and its associated actuation element to be displaced axially along the support element, but is precluded from rotating. A segmented ball recirculation end cap arrangement prevents the linear ball bearings from escaping axially from between the ball groove spline arrangement and the axial support element.

18 Claims, 2 Drawing Sheets

SCREW WITH RECIRCULATING BALL ARRANGEMENT

CROSS-REFERENCE TO RELATED APPLICATIONS

This application is a continuation of provisional application serial number 60/065,573 filed on Nov. 14, 1997.

BACKGROUND OF THE INVENTION

1. Field of the Invention

This invention relates generally to ball screw arrangements, and more particularly, to a compact recirculating ball linear bearing arrangement wherein ball recirculation is effected within a recess in the ball screw whereby axial translation of the ball screw along the length of an elongated nut is achieved the response to the application of a rotatory drive to the nut.

2. Description of the Related Art

A number of arrangements are available in the prior art wherein a ball screw and nut mechanism include an insert in the nut whereby balls are recirculated in the nut. Other known recirculating ball screw arrangements include a ball recirculating member that cooperates with a lead screw to urge the balls out of their normal track to transfer the balls over the lead screw in an axial direction and then deposit same back onto the ball track.

All of the known arrangements are large in the radial direction and therefore cannot be accommodated in a compact environment. Thus, for example, the known arrangements cannot readily be accommodated within the confines of a drive motor to achieve an arrangement having a compact radial dimension and that facilitates a linear displacements of the ball screw to an extent that corresponds to a significant proportion of the overall axial dimension of the motor drive.

It is, therefore, an object of this invention to provide a compact linear drive arrangement that has a reduced radial dimension requirement.

It is another object of this invention to provide a ball screw arrangement wherein ball recirculation does not require displacement of a ball further radially outward than the helical groove of the race.

It is also an object of this invention to provide an arrangement for facilitating assembly of the compact ball screw arrangement of the present invention.

It is additionally an object of this invention to provide a compact drive arrangement wherein a linear translation bearing is contained within a drive motor system.

It is yet a further object of this invention to provide a compact linear translation bearing arrangement wherein linear translation is achieved from within the motor drive arrangement and extends for a significant portion of the overall length of the drive arrangement.

It is yet an additional object of this invention to provide a splined linear bearing arrangement wherein an actuator element is coupled thereto in rotatively fixed relation, and is axially translatable with respect thereto.

SUMMARY OF THE INVENTION

The foregoing and other objects are achieved by this invention which provides, in a first apparatus aspect thereof, an axial displacement arrangement having a ball screw shaft with an external helical ball race formed therein. The helical ball race has a predetermined pitch and is arranged at a predetermined race groove radius with respect to a longitudinal axis of the ball screw shaft. Additionally, there is provided a recirculation arrangement in the ball screw shaft for recirculating balls in the helical race of the ball screw shaft whereby a ball recirculation circuit is formed.

In one embodiment of the invention, the recirculation arrangement is provided with a recirculation race formed in the ball screw shaft for forming an axial race path between predetermined points of the helical race. Such interconnection of the predetermined points of the helical race by the recirculation race forms the recirculating ball circuit. In addition, there is provided a recirculation race cover arranged to overlie the recirculation race. The race cover maintains the balls within the ball screw shaft during their respective traverse of the recirculation race. Additionally, the outer surface of the race cover does not extend outward of the maximum diameter of the ball screw shaft with the balls thereon, and therefore recirculation within the ball screw shaft is insured. Thus, the recirculation race has a predetermined race groove radius with respect to the longitudinal axis of the ball screw shaft which is shorter than that of the race groove radius. The recirculating balls, therefore, are rolled closer to the central axis of the ball screw shaft during recirculation.

In a highly advantageous embodiment of the invention, there is provided an axial support that is disposed in an axial hollow portion of the ball screw shaft. The ball screw shaft is axially translatable along the axial support. Preferably, the axial support is provided with longitudinal splines extending there along, the longitudinal splines operating to prevent rotation of the ball screw shaft with respect to the axial support. Thus, the ball screw shaft can translate axially along the axial support, but is not rotatable with respect thereto.

In a preferred embodiment, there is provided a plurality of ball bearings interposed between the axial support and the ball screw shaft. The ball bearings are circumferentially confined within respective support races that are disposed between circumferentially adjacent ones of the longitudinal splines. Thus, the ball bearings interposed between the axial support and the ball screw shaft are relegated to travel axially along the axial support. In a practical embodiment, the ball bearings interposed between the axial support and the ball screw shaft are confined to remain within the axial dimension of the ball screw shaft by operation of segmented ball recirculation end caps. Thus, as the ball screw shaft is translated along the axial support, the interposed ball bearings travel with the ball screw shaft.

In accordance with a further apparatus aspect of the invention, there is provided an axial displacement arrangement having a support having a longitudinal axis defining the axial displacement. An actuator element is coupled to the support means and is axially displaceable with respect thereto for effecting the axial displacement. Ball bearing supports are interposed between the support and the actuator element. On the outer surface of the actuator element there is provided a helical ball recirculation arrangement that is axially displaceable with respect to the support. The helical ball recirculation arrangement is provided with an external helical race having a predetermined external race pitch and is arranged to surround at least a portion of the helical ball recirculation arrangement. Additionally, the helical ball recirculation arrangement is provided with a transfer race for coupling the external helical race axially to itself whereby a ball recirculation circuit is formed. A ball recirculation cover is arranged to overlie the transfer race. Moreover, a nut having an internal helical race formed therein, the internal helical race having an internal race pitch that corresponds substantially to the predetermined external race pitch, is provided and has an internal helical race that is axially longer than the external helical race of the helical ball recirculation arrangement.

In one embodiment of this further aspect of the invention, there is provided a rotatory drive arrangement for turning the nut with respect to the support. Such rotation of the nut causes the helical ball recirculation arrangement and the actuator coupled axially thereto to be translated axially among the support and the interior of the nut. In one embodiment, the rotatory drive arrangement is in the form of an electric motor that is coupled to the nut. In a highly advantageous embodiment of the invention, the electric motor surrounds the nut. The electric motor is mechanically coupled to the support. This precludes any rotation of the electrical motor with respect to the support.

In such an embodiment of the invention, the axial length of the helical ball recirculation arrangement is responsive to the number of ball recirculation circuits thereon, and is significantly shorter than the axial length of the nut. The maximum translation, therefore, is responsive to the difference between the length of the helical ball recirculation arrangement and the axial length of the internal helical race of the nut.

In accordance with a method aspect of the invention, there is provided a method of translating a driven element axially. The method includes the steps of:

rotating an elongated nut having an internal helical race;

engaging a plurality of ball bearings between the elongated nut and the driven element, the driven element having a helical race; and recirculating the ball bearings within the driven element as the step of rotating the elongated nut is performed and the driven element is translated axially along the elongated nut.

In one embodiment of this method aspect of the invention, there is further provided the step of supporting the driven element on an axial support, the axial support being disposed axially parallel to the direction of translation of the driven element.

In a further embodiment, there is provided the further step of interposing a further plurality of ball bearings between the driven element and the axial support, whereby the driven element is translated with respect to the axial support.

There is additionally provided the step of containing the further plurality of ball bearings to prevent axial disengagement thereof from between the driven element and the axial support by installing a segmented axial stop member. Moreover, the step of rotating the elongated nut includes the further step of energizing a motor to impart a torque on the elongated nut.

BRIEF DESCRIPTION OF THE DRAWING

Comprehension of the invention is facilitated by reading the following detailed description, in conjunction with the annexed drawing, in which.

DETAILED DESCRIPTION

Figure 1:
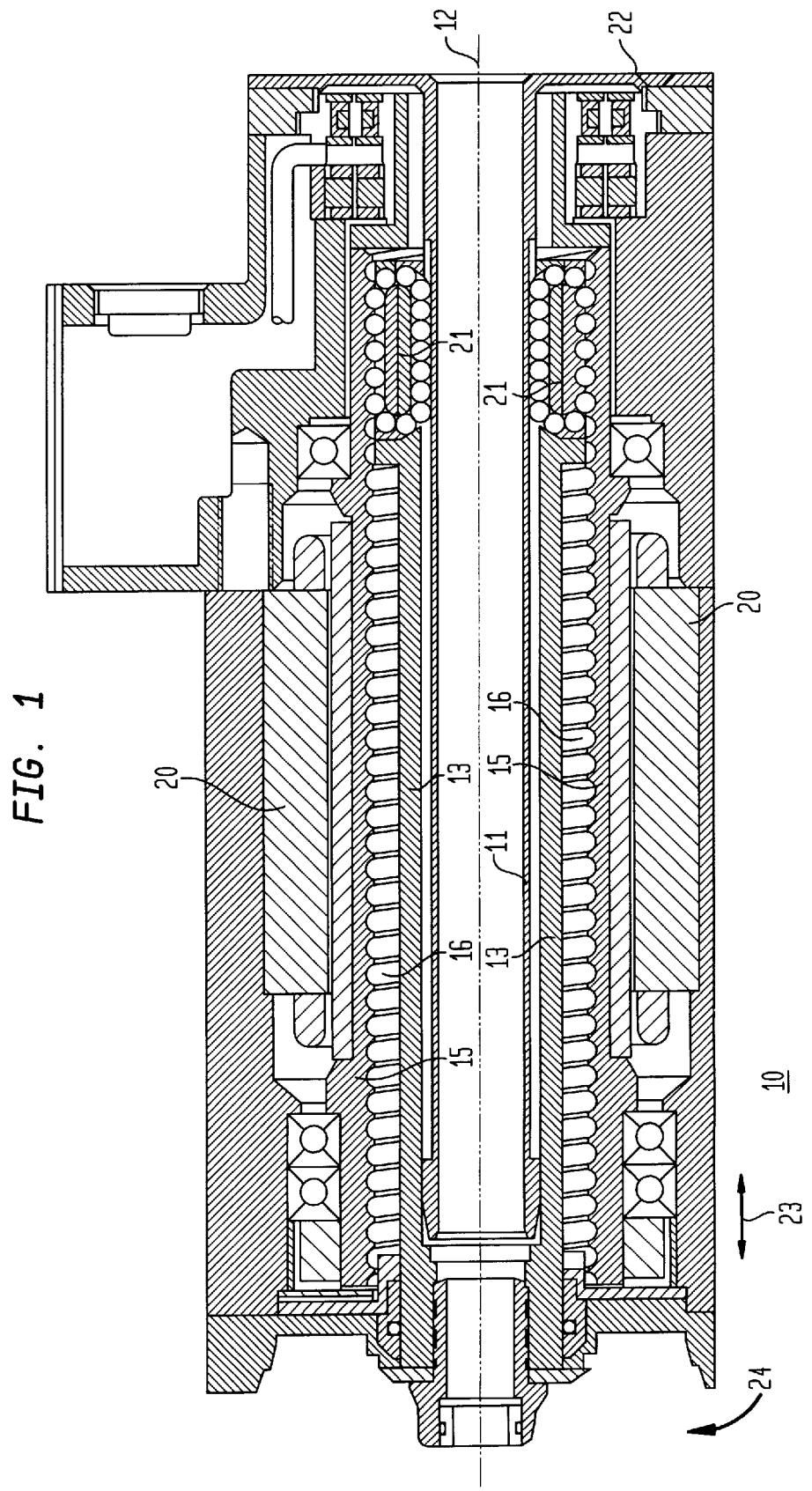
FIG. 1 is a simplified schematic, partially cross-sectional, plan representation of a specific illustrative embodiment of the invention.

FIG. 1 is a schematic, cross-sectional representation of a specific illustrative embodiment of the invention wherein an axial displacement arrangement 10 is provided with an axial support element 11 having a longitudinal axis 12. An actuation element 13 is arranged to surround support element 11, and as will be described herein, is axially displaceable with respect thereto. Actuation element 13 is surrounded by an elongated nut 15 that is provided with an internal helical race 16.

In this specific illustrative embodiment of the invention, nut 15 is coupled to an electric motor 20 which, upon being energized, causes nut 15 to rotate about central axis 12. Actuation element 13 is coupled to nut 15 by a ball recirculation arrangement 21 that is schematically represented in this figure. Electric motor 20 is reversible, and therefore actuation element 13 is axially displaceable along central axis 12, in the directions designated by dual headed arrow 23.

Support element 11 is mechanically grounded at its rear portion 22. Electric motor 20 also is mechanically grounded at rear portion 22 of the axial displacement arrangement, and therefore the support element and the electric motor move neither axially nor circumferentially with respect to one another. As shown, nut 15 is rotatably disposed within the axial displacement arrangement, but is precluded from axial displacement. Thus, only actuation element 13 and the ball recirculation arrangement are axially translatable.

In this specific embodiment, actuation element 13 is coupled to other mechanism (not shown) in a region designated generally as 24. Such additional mechanism may include an injector arrangement for glass or plastic, and aircraft wing actuator, or any other application where a strong linear force is desired to be delivered, within a small space.

Figure 2:
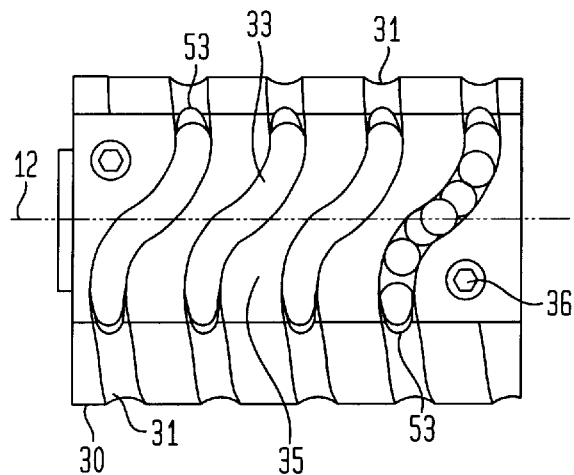
FIG. 2 is a schematic top plan view of a ball screw constructed in accordance with the invention, showing axial recirculation of ball bearings to form four ball recirculation circuits in this embodiment.

FIG. 2 is a simplified top plan representation of a ball recirculation arrangement 30. The external surface of ball recirculation arrangement 30 is provided with a plurality of helical race grooves 31 along which ball bearings (not shown) travel. The helical race grooves are shown to be interrupted by a respectively associated recirculation race 33 whereby a path is created that permits the ball bearings to be translated axially back to the same helical race groove. Thus, each helical race groove 31 and its associated recirculation race 33 form a recirculation circuit. As will be described below, particularly with respect to FIG. 4, recirculation of the balls is achieved within the ball recirculation arrangement, and does not rely on recirculation through the nut (not shown in this figure).

Recirculation race grooves 33 are disposed under a cover 35 that is coupled to the ball recirculation arrangement this embodiment by screws 36. Thus, as the balls travel along the respectively associated recirculation race 33, they are maintained within the ball recirculation arrangement by operation of cover 35.

Figure 3:
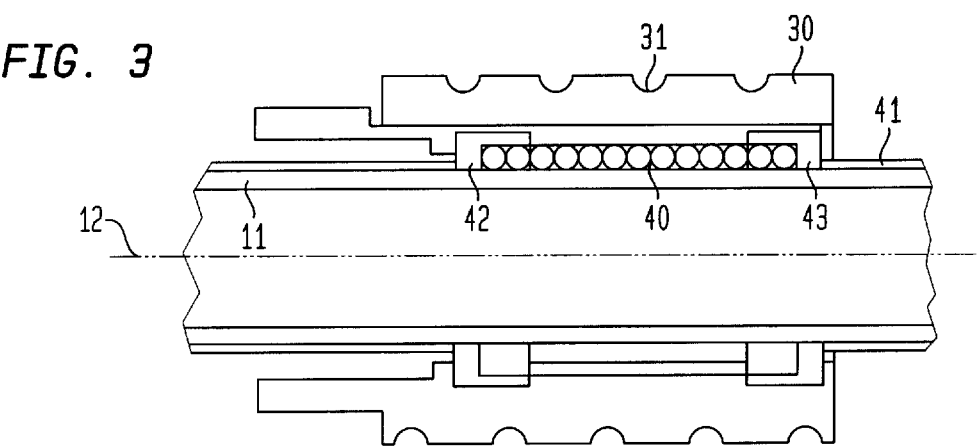
FIG. 3 is a partially cross-sectional simplified schematic representation of an embodiment of the invention showing a plurality of ball bearings interposed between the ball screw and an axial support.

FIG. 3 is a cross-sectional representation of a specific illustrative embodiment of the invention. Elements of structure that correspond to those previously discussed are similarly designated. As shown, ball recirculation arrangement 30 is arranged to be slidably engaged with support element 11. A plurality of ball bearings 40 are interposed between the ball recirculation arrangement and the support element such that the ball recirculation arrangement is axially displaceable along the support element. As shown, ball bearings 40 are contained within the axial length of ball recirculation arrangement 30. The ball bearings are prevented from circumferential movement around support element 11 by operation of splines 41, that will be described in greater detail in connection with FIG. 4.

Referring to FIG. 3, ball bearings 40 are prevented from escaping axially from between the ball recirculation arrangement and the support element by operation of ball recirculation end caps 42 and 43. In this specific embodiment of the invention, ball recirculation end caps 42 and 43 are arranged in the form of segments, each such segment being associated with an inter-spline region on the outer surface of the support element. Such a segmented ball recirculation end cap arrangement facilitates assembly of the axial displacement arrangement.

Figure 4:
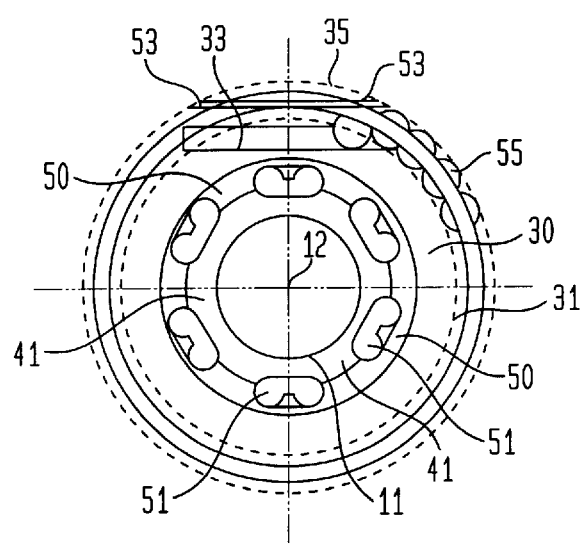
FIG. 4 is a simplified schematic, partially cross-sectional, axially transverse representation of the embodiment of FIG. 3, showing the spline configuration of the axial support and recirculation of a ball bearings within the ball screw.

FIG. 4 is a partially cross-sectional end view of the embodiment of FIG. 3, showing six longitudinal splines 41 (in end view). Ball recirculation arrangement 30 is shown to have a corresponding plurality of internal splines 50 that are arranged face-to-face with splines 41 of the support member. Thus, an inter-spline region 51 is formed between splines 41 of support member 11 and radially inward splines 50 of ball recirculation arrangement 30. Ball bearings 40 (not shown in this figure) are accommodated within inter-spline region 51.

FIG. 4 further shows recirculation race 33 and cover 35. In addition, cover 35 is shown to have fingers 53 extending outward therefrom. As balls 55 are circulated along helical race groove 31, they communicate with fingers 53 of the cover and are urged onto recirculation race 33. As can be seen in this figure, the recirculation race is arranged at a radius with respect to central axis 12 that is shorter than the corresponding radius of helical race groove 31. Thus, cover 35 and its associated fingers 53 do not extend beyond the outermost diameter of balls 55, with respect to central axis 12. Ball recirculation, therefore, is achieved entirely within the helical recirculation arrangement.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An axial displacement arrangement comprising:
   a ball screw shaft having a plurality of external helical ball races formed in the surface thereof each having a predetermined pitch and arranged at a predetermined race groove radius with respect to a longitudinal axis of the ball screw shaft; and
   a plurality of recirculation arrangements in said ball screw shaft for recirculating balls in respectively associated ones of the helical races of said ball screw shaft whereby a plurality of ball recirculation circuits is formed, each of said recirculation arrangements being provided with a respectively associated recirculation race formed in the surface of said ball screw shaft for forming an axial race path between predetermined points of the associated helical race, thereby forming a plurality of recirculating ball circuits, respective recirculation races being arranged in axial alignment with each other.

2. The axial displacement arrangement of claim 1, wherein said recirculation arrangement further comprises a race cover arranged to overlie the plurality of axially aligned recirculation races.

3. The axial displacement arrangement of claim 2, wherein each of said recirculation races has a predetermined recirculation race groove radius with respect to the longitudinal axis of the ball screw shaft to be shorter than the predetermined race groove radius.

4. The axial displacement arrangement of claim 3, wherein said race cover has a radially outer surface that is radially disposed at a predetermined outer surface radius with respect to the longitudinal axis of the ball screw shaft.

5. The axial displacement arrangement of claim 1, wherein there is further provided an axial support means arranged in an axial hollow portion of said ball screw shaft, whereby said ball screw shaft is axially translatable therealong.

6. The axial displacement arrangement of claim 5, wherein there are further provided longitudinal splines on said axial support for preventing rotation of said ball screw shaft with respect to said axial support.

7. The axial displacement arrangement of claim 6, wherein there is further provided a plurality of ball bearings interposed between said axial support and said ball screw shaft.

8. The axial displacement arrangement of claim 6, wherein said ball bearings are confined within respective support races between adjacent ones of the longitudinal splines, and there is further provided a plurality of sectional terminations for effecting axial closure of respective ones of said support races.

9. An axial displacement arrangement comprising:
   a support having a longitudinal axis corresponding to a direction of the axial displacement;
   an actuator coupled to said support, said actuator being axially displaceable with respect to said support for effecting the axial displacement;
   a ball bearing support interposed between said support and said actuator;
   a helical ball recirculation arrangement coupled axially to said actuator, said helical ball recirculation arrangement being axially displaceable with respect to said support, and having,
     an external helical race having a predetermined external race pitch and arranged in the surface of said actuator to surround at least a portion of said helical ball recirculation arrangement; and
     an external transfer race arranged in the surface of said actuator for coupling said external helical race axially to itself whereby a ball recirculation circuit is formed;
   a ball recirculation cover arranged to overlie said transfer race; and
   a nut having an internal helical race formed therein, said internal helical race having an internal helical race pitch that corresponds substantially to said predetermined external race pitch, said internal helical race being axially longer than said external helical race.

10. The axial displacement arrangement of claim 9, wherein there is further provided a rotatory drive for turning said nut with respect to said support, whereby said helical ball recirculation arrangement and said actuator coupled axially thereto are translated axially along said support and said nut.

11. The axial displacement arrangement of claim 10, wherein said rotatory drive comprises an electric motor arranged to surround said nut.

12. The axial displacement arrangement of claim 11, wherein said electric motor is coupled to said support to preclude rotation of said electric motor with respect to said support.

13. The axial displacement arrangement of claim 10, wherein the translation axially along said support and said nut has a maximum translation distance that corresponds to the difference between the axial lengths of said helical ball recirculation arrangement and said internal helical race.

14. A method of translating a driven element axially, the method comprising the steps of:

rotating an elongated nut having an internal helical race;

engaging a plurality of ball bearings between the elongated nut and the driven element, the driven element having a helical race; and recirculating the ball bearings along a recirculation raceway in the surface of the driven element as the step of rotating the elongated nut is performed and the driven element is translated axially along the elongated nut.

15. The method of claim 14, wherein there is further provided the step of supporting the driven element on an axial support, the axial support being disposed axially parallel to the direction of translation of the driven element.

16. The method of claim 15, wherein there is further provided the step of interposing a further plurality of ball bearings between the driven element and the axial support, whereby the driven element is translated with respect to the axial support.

17. The method of claim 16, wherein there is further provided the step of containing the further plurality of ball bearings to prevent axial disengagement thereof from between the driven element and the axial support by installing a segmented axial ball recirculation end cap member.

18. The method of claim 14, wherein said step of rotating the elongated nut comprises the further step of energizing a motor to impart a torque to the elongated nut.

* * * * *